US011276074B1

(12) United States Patent
Stier Moses et al.

(10) Patent No.: US 11,276,074 B1
(45) Date of Patent: Mar. 15, 2022

(54) COMPUTING A VALUE ASSOCIATED WITH PRESENTING A CONTENT ITEM TO A USER OF AN ONLINE SYSTEM BASED ON A DETRIMENTAL EFFECT OF A PLACEMENT OF THE CONTENT ITEM WITHIN A FEED OF CONTENT ITEMS

(71) Applicant: Facebook, Inc., Menlo Park, CA (US)

(72) Inventors: Nicolas Emilio Stier Moses, Palo Alto, CA (US); Dominic Coey, Palo Alto, CA (US); Okke Joost Schrijvers, San Francisco, CA (US); Eric Michael Sodomka, Menlo Park, CA (US); Christopher Albert Wilkens, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 207 days.

(21) Appl. No.: 16/167,897

(22) Filed: Oct. 23, 2018

(51) Int. Cl.
*G06Q 30/02* (2012.01)

(52) U.S. Cl.
CPC ..... *G06Q 30/0242* (2013.01); *G06Q 30/0275* (2013.01)

(58) Field of Classification Search
None
See application file for complete search history.

(56) References Cited

U.S. PATENT DOCUMENTS

| 8,433,603 B1* | 4/2013 | Shon | G06Q 30/02 705/7.35 |
| 2013/0325585 A1* | 12/2013 | Amit | G06Q 30/0241 705/14.41 |
| 2015/0100415 A1* | 4/2015 | Yu | G06Q 30/0251 705/14.49 |
| 2016/0358229 A1* | 12/2016 | Bhalgat | G06Q 50/01 |

* cited by examiner

*Primary Examiner* — John Van Bramer
(74) *Attorney, Agent, or Firm* — Fenwick & West LLP

(57) ABSTRACT

An online system identifies an opportunity to present content to a viewing user and sends candidate content items eligible for presentation to the viewing user for display to a client device associated with the viewing user. The online system computes an estimated value associated with presenting a candidate content item to the viewing user based at least in part on a bid amount associated with the candidate content item and communicates the value to a content-providing user associated with the candidate content item. Based on information received from the client device describing the placement of one or more candidate content items within a feed of content items presented to the viewing user, the online system calculates a detrimental effect of presenting the candidate content item on user engagement with the online system by the viewing user and computes an adjusted value associated with its presentation based on the detrimental effect.

25 Claims, 4 Drawing Sheets

COMPUTING A VALUE ASSOCIATED WITH PRESENTING A CONTENT ITEM TO A USER OF AN ONLINE SYSTEM BASED ON A DETRIMENTAL EFFECT OF A PLACEMENT OF THE CONTENT ITEM WITHIN A FEED OF CONTENT ITEMS

BACKGROUND

This disclosure relates generally to online systems, and more specifically to computing a value associated with presenting a content item to a user of an online system based on a detrimental effect of a placement of the content item within a feed of content items.

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system. An online system also provides advertisers with abundant opportunities to increase awareness about their products or services by presenting advertisements to online system users. For example, advertisements presented to users allow an advertiser to gain public attention for products or services and to persuade online system users to take an action regarding the advertiser's products, services, opinions, or causes.

Conventionally, online systems generate revenue by displaying content to their users. For example, an online system may charge an advertiser for each presentation of an advertisement to an online system user (i.e., each "impression"), or for each interaction with an advertisement by an online system user (e.g., each click on the advertisement, each purchase made as a result of clicking through the advertisement, etc.). Furthermore, by presenting content that encourages user engagement with online systems, online systems may increase the number of opportunities they have to generate revenue. For example, if an online system user scrolls through a newsfeed to view content that captures the user's interest, advertisements that are interspersed in the newsfeed also may be presented to the user.

Generally, online systems determine values to the online systems associated with presenting content items (e.g., advertisements) to online system users and may communicate these values to content-providing users of the online systems (e.g., advertisers). For example, an online system may determine amounts to charge an advertiser for presentations of an advertisement to users of the online system and may communicate the amounts to the advertiser. Online systems may determine these values based on positions within a user interface in which the content items are presented, in which certain positions are more desirable than others. For example, suppose that an online system presents a first advertisement to an online system user in a most prominent position within a newsfeed, such that the user is able to view the first advertisement without having to scroll through the newsfeed. In this example, suppose that the online system also presents a second advertisement to the user in a less prominent position within the newsfeed, such that the user is able to view the second advertisement only after scrolling past several other content items. Continuing with this example, an advertiser associated with the first advertisement may be charged more than an advertiser associated with the second advertisement since the first advertisement is presented in a more desirable position within the newsfeed than the second advertisement. Additionally, values associated with presenting content items may account for the fact that the content items may displace other content items within a user interface, such that the displaced content items may be presented in less prominent positions within the user interface. In the above example, since each advertisement may displace other content items presented within the newsfeed, the amount charged for presenting each advertisement may be determined by the online system to offset any negative effects its presentation may have on user engagement with the online system.

However, it may be difficult for online systems to accurately determine values associated with presenting content items to their users because real-time information that is not available to the online systems may affect the types and/or number of content items that may be presented within a user interface and the positions within the user interface in which the content items may be presented. For example, an orientation of a client device or a zoom setting on the client device may affect the number of content items within a newsfeed that may be presented in a display area of the client device without requiring a user of the online system associated with the client device to scroll in order to view additional content items within the newsfeed. Furthermore, the displacement of content due to the presentation of advertisements and other types of content items to online system users may negatively affect user engagement with online systems, further complicating the issue of determining values associated with presenting content items. Thus, online systems may have difficulty determining accurate values associated with presenting content items to their users and consequently may communicate inaccurate values associated with their presentation to content-providing users of the online systems.

SUMMARY

Conventionally, online systems determine values associated with presenting content items to online system users based on positions within user interfaces in which the content items are presented, in which certain positions (e.g., more prominent positions) are more desirable than others. However, it may be difficult for online systems to accurately determine these values because real-time information that is not available to the online systems may affect the types and/or number of content items that may be presented within a user interface and the positions within the user interface in which the content items may be presented. Moreover, the displacement of content due to the presentation of advertisements and other types of content items to online system users may negatively affect user engagement with online systems, which further complicates the issue of determining accurate values associated with presenting content items.

To more accurately compute values associated with presenting content to online system users, an online system computes a value associated with presenting a content item to a viewing user of the online system based on a detrimental effect of a placement of the content item within a feed of content items. More specifically, upon identifying an opportunity to present content to the viewing user, the online system sends candidate content items eligible for presentation to the viewing user to a client device associated with the viewing user. The client device then ranks and determines a placement of each candidate content item within a feed of content items based on information that may not be immediately available to the online system and presents the feed to the viewing user. The online system computes an estimated value associated with presenting a candidate content item to the viewing user based at least in part on a bid amount associated with the candidate content item and communicates the estimated value to a content-providing user of the online system associated with the candidate content item. To account for any inaccuracy with respect to the estimated value, based on information received from the client device describing the placement of one or more candidate content items within the feed, the online system calculates a detrimental effect of presenting the candidate content item to the viewing user on user engagement with the online system by the viewing user and computes an adjusted value associated with its presentation based on the detrimental effect. The online system may then communicate the adjusted value to the content-providing user of the online system associated with the candidate content item.

In various embodiments, rather than computing two values associated with presenting a candidate content item to a viewing user (i.e., an estimated value and an adjusted value), the online system may compute a single value associated with presenting the candidate content item to the viewing user. In such embodiments, the online system may calculate the detrimental effect of presenting the candidate content item to the viewing user on user engagement with the online system by the viewing user, as described above. The online system may then compute a value associated with presenting the candidate content item to the viewing user based at least in part on the detrimental effect and communicate the value to a content-providing user of the online system associated with the candidate content item.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
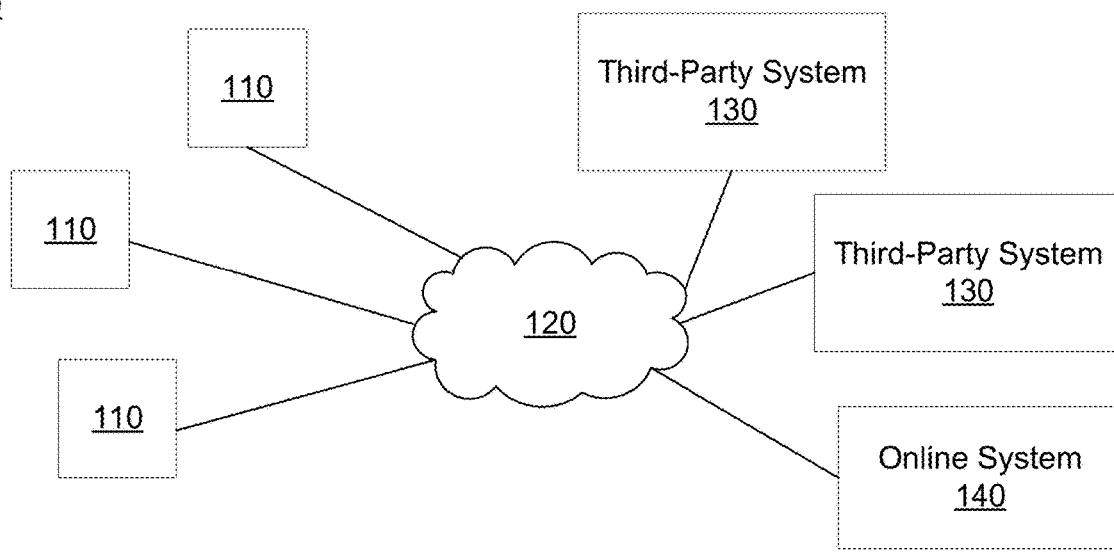
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
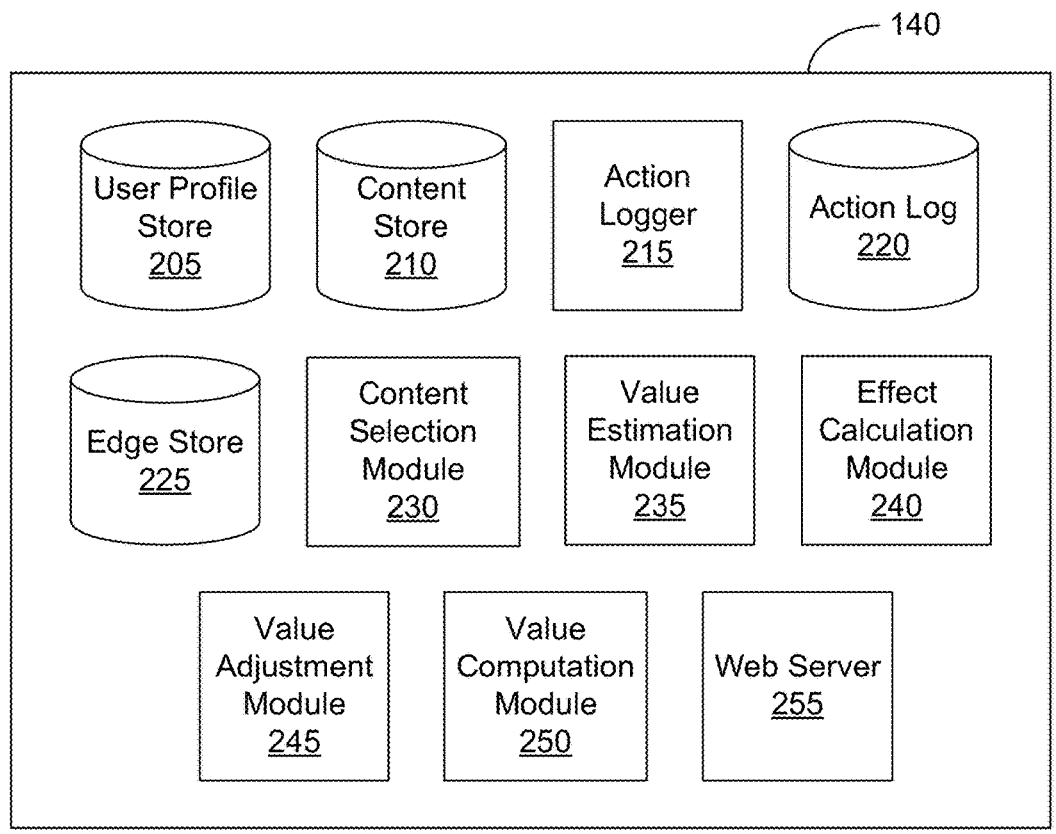
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, a value estimation module 235, an effect calculation module 240, a value adjustment module 245, a value computation module 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

While user profiles in the user profile store 205 are frequently associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010 (U.S. Publication No. US 2012/0166532 A1, published on Jun. 28, 2012), U.S. patent application Ser. No. 13/690, 254 (U.S. Pat. No. 9,070,141, issued on Jun. 30, 2015), filed on Nov. 30, 2012, U.S. patent application Ser. No. 13/689, 969, filed on Nov. 30, 2012 (U.S. Pat. No. 9,317,812, issued on Apr. 19, 2016), and U.S. patent application Ser. No. 13/690,088, filed on Nov. 30, 2012 (U.S. Publication No. US 2014/0156360 A1, published on Jun. 5, 2014), each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 may identify (e.g., as shown in step 310 of FIG. 3A) candidate content items eligible for presentation to a user of the online system 140. A candidate content item is a content item associated with at least a threshold number of targeting criteria satisfied by characteristics of a user or is a content item that is not associated with targeting criteria. Targeting criteria associated with a content item may specify one or more characteristics of users of the online system 140 eligible to be presented with content in the content item. For example, targeting criteria associated with a content item may specify user profile information (e.g., demographic information, interests, etc.) associated with online system users eligible to be presented with the content item. Targeting criteria associated with a content item may be specified by a content-providing user of the online system 140 associated with the content item. For example, if a content item corresponds to an advertisement, targeting criteria associated with the advertisement may be specified by an advertiser associated with the advertisement. Hence, targeting criteria allow a content-providing user of the online system 140 to identify groups of users matching specific targeting criteria, simplifying subsequent distribution of content to groups of users.

In one embodiment, targeting criteria associated with a content item may specify actions or types of connections between a user and another user or an object of the online system 140. Targeting criteria associated with a content item also may specify interactions between a user and objects performed external to the online system 140, such as on a third-party system 130. For example, targeting criteria may identify online system users who have taken a particular action, such as sending a message to another user, using an application, joining a group, leaving a group, joining an event, generating an event description, purchasing or reviewing a product or a service using an online marketplace, requesting information from a third-party system 130, or any other suitable action. Including actions in targeting criteria associated with content items allows content-providing users of the online system 140 to further refine online system users eligible to be presented with the content items.

In some embodiments, the content selection module 230 may identify candidate content items eligible to be presented to a user by accessing information stored in the content store 210, the user profile store 205, the action log 220, and/or the edge store 225. For example, the content selection module 230 may access the content store 210 to retrieve targeting criteria associated with various content items. In this example, the content selection module 230 also may access the user profile store 205, the action log 220, and the edge store 225 and use the targeting criteria associated with each content item as a filter that is applied to user profile information and information describing edges and/or actions associated with online system users to identify users satisfying at least one of the targeting criteria. The functionality of the content selection module 230 is further described below in conjunction with FIG. 3A.

The value estimation module 235 computes (e.g., as shown in step 320 of FIG. 3A) an estimated value associated with presenting a candidate content item to a viewing user of the online system 140, in which the estimated value corresponds to a value to the online system 140 (e.g., an amount charged to an advertiser). In some embodiments, the value estimation module 235 computes an estimated value associated with presenting a candidate content item to a viewing user based at least in part on a bid amount associated with the candidate content item. In such embodiments, the bid amount may be received from a content-providing user of the online system 140 associated with the candidate content item (e.g., an advertiser from whom an advertisement corresponding to the candidate content item was received).

In various embodiments, the value estimation module 235 also may compute an estimated value associated with presenting a candidate content item to a viewing user of the online system 140 based at least in part on a predicted affinity of the viewing user for the candidate content item. In such embodiments, the value estimation module 235 may predict the affinity of the viewing user for the candidate content item (e.g., using a machine-learning model) based at least in part on information associated with the candidate content item (e.g., targeting criteria) and user-specific information associated with the viewing user maintained in the online system 140 (e.g., demographic information associated with the viewing user, actions performed by the viewing user in the online system 140, interests/hobbies of online system users connected to the viewing user in the online system 140, etc.). For example, the value estimation module 235 may use a machine-learning model to predict that a viewing user has a higher affinity for a candidate content item if the viewing user is associated with several attributes identified by a set of targeting criteria associated with the candidate content item than if the viewing user is associated with only a few attributes that are identified by the targeting criteria. In this example, the value estimation module 235 may compute the estimated value associated with presenting the candidate content item to the viewing user based on the predicted affinity, such that the estimated value is proportional to the predicted affinity.

In some embodiments, the value estimation module 235 also may compute an estimated value associated with presenting a candidate content item to a viewing user of the online system 140 based at least in part on an adjustment value curve associated with the viewing user and/or a client device 110 associated with the viewing user. An adjustment value curve correlates adjustment values to positions within a feed of content items in which candidate content items may be sent for display to a viewing user. For example, suppose that the online system 140 sends a candidate content item for display to a client device 110 associated with a viewing user of the online system 140 in a particular position within a feed of content items. In this example, the value estimation module 235 accesses an adjustment value curve maintained in the online system 140 associated with the client device 110 and determines an adjustment value along the curve corresponding to the position within the feed in which the candidate content item is sent to the client device 110 for display to the viewing user. Continuing with this example, the value estimation module 235 then computes an estimated value associated with presenting the candidate content item to the viewing user by retrieving a bid amount associated with the candidate content item and by adjusting the bid amount by the adjustment value.

In embodiments in which the value estimation module 235 computes an estimated value associated with presenting a candidate content item to a viewing user of the online system 140 based at least in part on an adjustment value curve, the value estimation module 235 may generate the adjustment value curve based on various types of information maintained in the online system 140. For example, the value estimation module 235 may generate an adjustment value curve associated with a client device 110 associated with a viewing user based on information describing the client device 110 (e.g., an operating system executing in the client device 110 or a type of computing system corresponding to the client device 110). In this example, the value estimation module 235 also may generate the adjustment value curve based on information associated with the viewing user (e.g., a frequency with which the viewing user previously interacted with content items presented in various positions within a feed of content items, a time zone associated with the viewing user, a frequency with which the viewing user previously interacted with the online system 140 during various times of the day, etc.). In some embodiments, the value estimation module 235 also may store an adjustment value curve (e.g., in association with information identifying a viewing user/a client device 110 associated with the viewing user in the user profile store 205).

Once the value estimation module 235 has computed an estimated value associated with presenting a candidate content item to a viewing user, the value estimation module 235 may store (e.g., as shown in step 325 of FIG. 3A) the estimated value. For example, the value estimation module 235 may store an estimated value associated with presenting a candidate content item to a viewing user in association with a user profile of the viewing user (e.g., in the user profile store 205) and/or in association with information describing the presentation of the candidate content item to the viewing user (e.g., in the action log 220). As an additional example, the value estimation module 235 may store an estimated value associated with presenting a candidate content item to a viewing user in association with an object representing the candidate content item (e.g., in the content store 210). The functionality of the value estimation module 235 is further described below in conjunction with FIG. 3A.

The effect calculation module 240 calculates (e.g., as shown in step 365 of FIG. 3B) a detrimental effect of presenting a candidate content item to a viewing user of the online system 140 on user engagement with the online system 140 by the viewing user, in which the detrimental effect is sustained by the online system 140. In various embodiments, the detrimental effect of presenting a candidate content item to a viewing user of the online system 140 on user engagement with the online system 140 by the viewing user may account for a reduction in user engagement by the viewing user with other content items (e.g., advertisements) with which the viewing user is likely to engage. In such embodiments, the viewing user is less likely to engage with these content items if they are displaced by the candidate content item (e.g., if the content items are displaced to lower positions within a feed of content items since the viewing user must scroll further down the feed to view them). In some embodiments, the effect calculation module 240 may calculate the detrimental effect of presenting a candidate content item to a viewing user of the online system 140 based on information received (e.g., as shown in step 355 of FIG. 3B) from a client device 110 associated with the viewing user describing the placement of one or more candidate content items within a feed of content items presented to the viewing user. In such embodiments, the effect calculation module 240 may calculate the detrimental effect by determining a difference between an effect of presenting the candidate content item to the viewing user on user engagement with the online system 140 by the viewing user and an effect of not presenting the candidate content item to the viewing user on user engagement with the online system 140 by the viewing user.

In some embodiments, an effect of presenting a candidate content item to a viewing user on user engagement with the online system 140 by the viewing user may correspond to information received (e.g., as shown in step 360 of FIG. 3B) from a client device 110 associated with the viewing user describing user engagement with the online system 140 by the viewing user. In various embodiments, the effect calculation module 240 may predict an effect of presenting a candidate content item to a viewing user of the online system 140 on user engagement with the online system 140 by the viewing user and/or an effect of not presenting the candidate content item to the viewing user on user engagement with the online system 140 by the viewing user. In such embodiments, the effect calculation module 240 may predict the effect(s) using a machine-learning model (e.g., based on historical actions performed by the viewing user in the online system 140 in association with previous presentations of similar content items in similar positions within a feed).

To illustrate an example of how the effect calculation module 240 may calculate a detrimental effect of presenting a candidate content item to a viewing user of the online system 140 on user engagement with the online system 140 by the viewing user, suppose that the online system 140 receives information from a client device 110 associated with the viewing user describing the placement of candidate content items within a newsfeed presented to the viewing user, in which one of the candidate content items corresponds to an advertisement. In this example, the online system 140 also may receive information from the client device 110 describing an amount of user engagement with the online system 140 by the viewing user in response to being presented with the newsfeed. Continuing with this example, the effect calculation module 240 may use a machine-learning model to predict an amount of user engagement with the online system 140 by the viewing user if the advertisement had not been presented to the viewing user (i.e., if other content within the newsfeed had not been displaced by the advertisement). In the above example, the effect calculation module 240 may calculate a difference between these effects, which may indicate a detrimental effect of presenting the advertisement to the viewing user on user engagement with the online system 140 by the viewing user (i.e., if the amount of user engagement with the online system 140 in response to being presented with the newsfeed is less than the predicted amount of user engagement with the online system 140 if the advertisement had not been presented to the viewing user). The functionality of the effect calculation module 240 is further described below in conjunction with FIG. 3B.

The value adjustment module 245 computes (e.g., as shown in step 370 of FIG. 3B) an adjusted value associated with presenting a candidate content item to a viewing user of the online system 140. Similar to the estimated value described above, the adjusted value corresponds to a value to the online system 140. In some embodiments, the value adjustment module 245 may compute an adjusted value associated with presenting a candidate content item to a viewing user based at least in part on a detrimental effect of presenting the candidate content item to the viewing user on user engagement with the online system 140 by the viewing user (e.g., using a Vickrey-Clarke-Groves mechanism). For example, the value adjustment module 245 may compare a change to an amount of user engagement with the online system 140 by a viewing user of the online system 140 to a threshold amount of change in user engagement with the online system 140, in which the change to the amount of user engagement with the online system 140 corresponds to a detrimental effect of presenting a candidate content item to the viewing user on user engagement with the online system 140 by the viewing user. In this example, the value adjustment module 245 may compute an adjusted value associated with presenting the candidate content item to the viewing user that is higher than an estimated value associated with presenting the candidate content item to the viewing user (computed by the value estimation module 235) if the detrimental effect is greater than the threshold amount of change. In contrast, in the above example, the value adjustment module 245 may compute an adjusted value associated with presenting the candidate content item to the viewing user that is lower than the estimated value associated with presenting the candidate content item to the viewing user if the detrimental effect is less than the threshold amount of change. In the above example, the value adjustment module 245 may compute an adjusted value associated with presenting the candidate content item to the viewing user that is equal to the estimated value associated with presenting the candidate content item to the viewing user if the detrimental effect is equal to the threshold amount of change. Furthermore, in the above example, the adjusted value associated with presenting the candidate content item to the viewing user may be proportional to a difference between the detrimental effect and the threshold amount of change. The functionality of the value adjustment module 245 is further described below in conjunction with FIG. 3B.

In various embodiments, the value computation module 250 may compute (e.g., as shown in step 375 of FIG. 3B) a value associated with presenting a candidate content item to a viewing user of the online system 140, in which the value corresponds to a value to the online system 140 (e.g., an amount charged to an advertiser). In such embodiments, the value computation module 250 may compute the value associated with presenting the candidate content item to the viewing user based at least in part on a detrimental effect of presenting the candidate content item to the viewing user on user engagement with the online system 140 by the viewing user. For example, if a candidate content item corresponds to an advertisement, once the effect calculation module 240 has calculated a detrimental effect of presenting the advertisement to a viewing user of the online system 140 on user engagement with the online system 140 by the viewing user, the value computation module 250 may then compute a value associated with presenting the advertisement to the viewing user based on the detrimental effect, such that the value is proportional to the detrimental effect. The functionality of the value computation module 250 is further described below in conjunction with FIG. 3B.

The web server 255 links the online system 140 via the network 120 to the one or more client devices 110, as well as to the one or more third-party systems 130. The web server 255 serves web pages, as well as other content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3A:
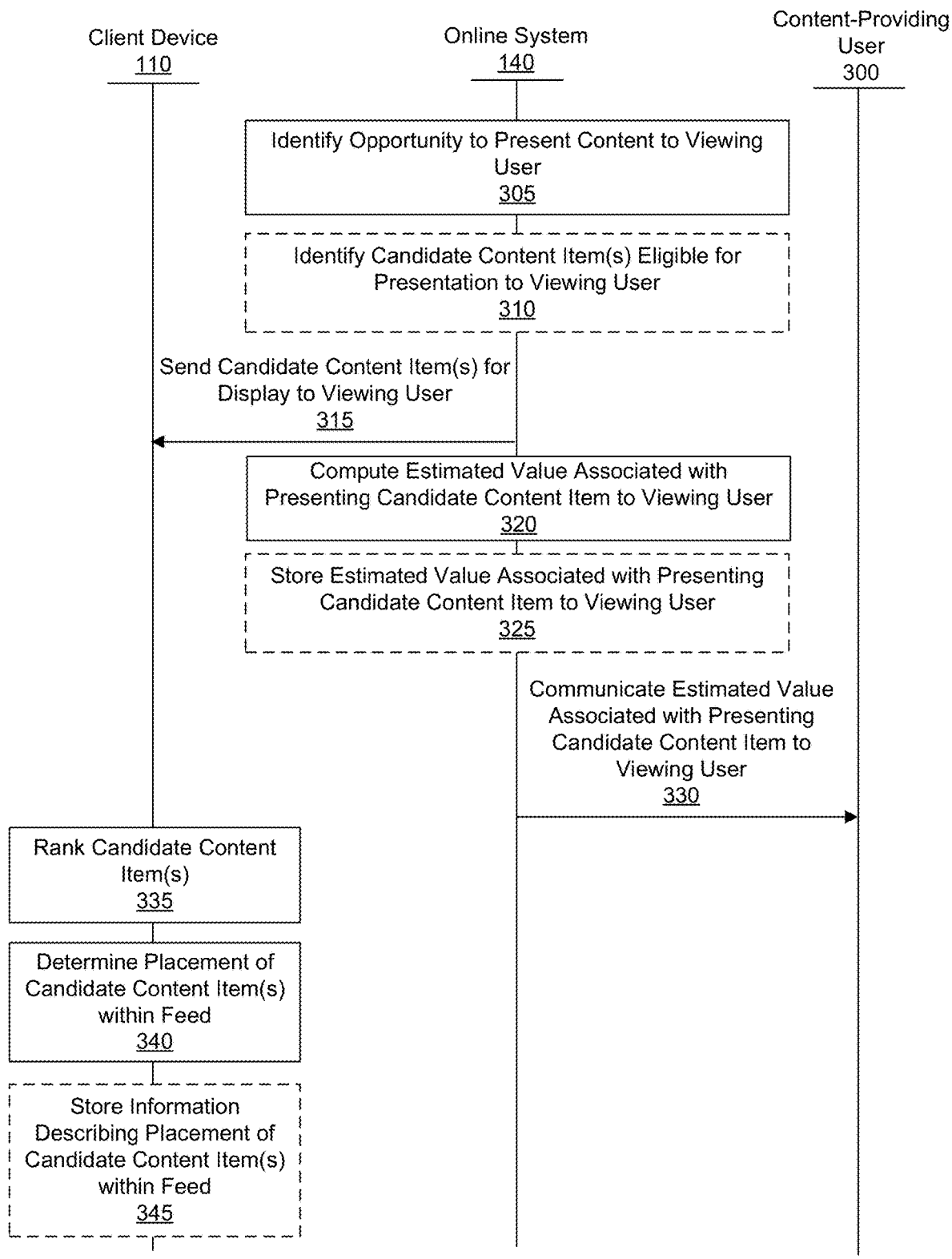
FIGS. 3A and 3B are interaction diagrams of a method for computing a value associated with presenting a content item to a user of an online system based on a detrimental effect of a placement of the content item within a feed of content items, in accordance with an embodiment.
Figure 3B:
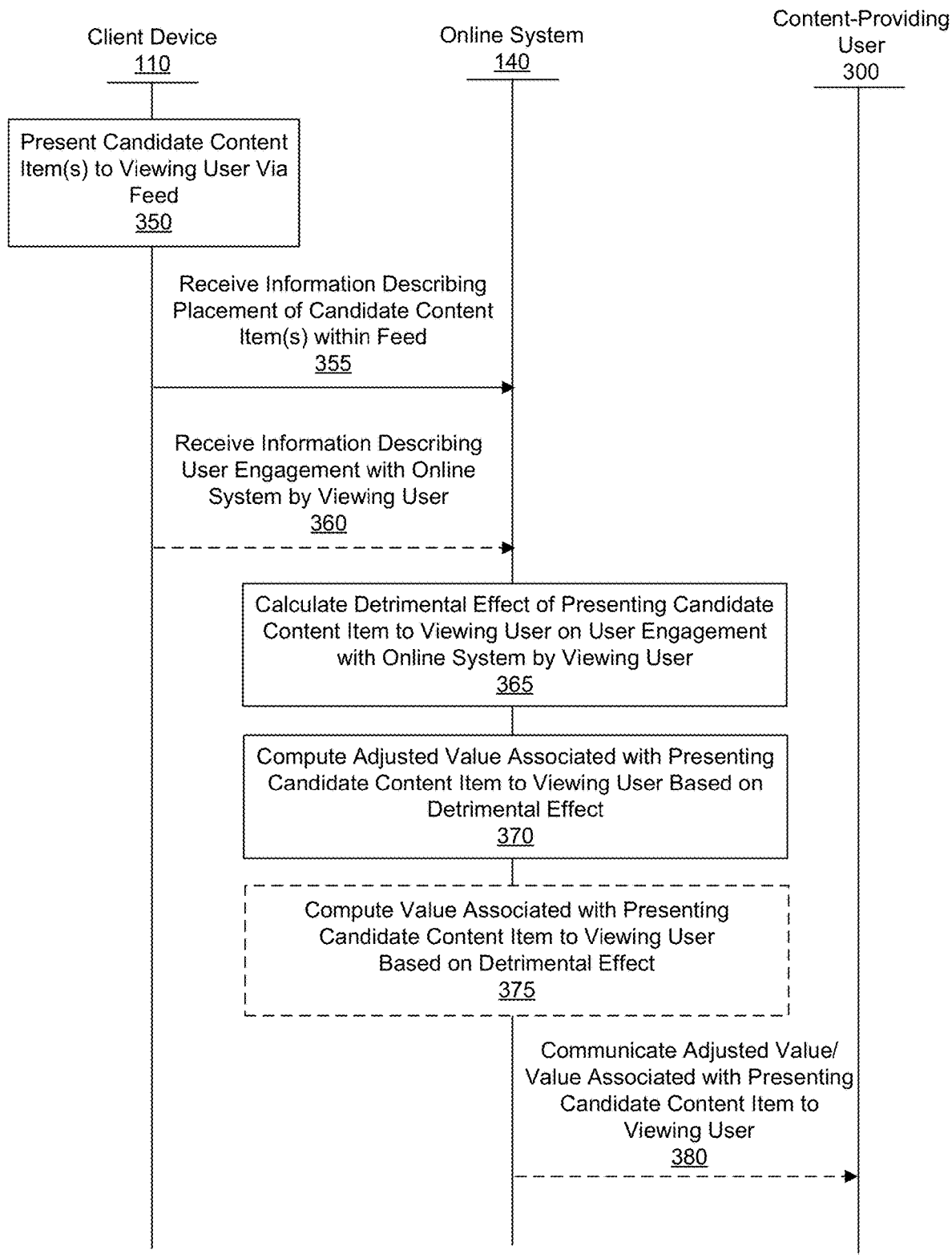

Computing a Value Associated with Presenting a Content Item to a User of an Online System Based on a Detrimental Effect of a Placement of the Content Item within a Feed of Content Items FIGS. 3A and 3B are interaction diagrams of a method for computing a value associated with presenting a content item to a user of an online system based on a detrimental effect of a placement of the content item within a feed of content items. In other embodiments, the method may include different and/or additional steps than those shown in FIGS. 3A and 3B. Additionally, steps of the method may be performed in a different order than the order described in conjunction with FIGS. 3A and 3B.

The online system 140 identifies 305 an opportunity to present content to a viewing user of the online system 140. For example, the online system 140 may identify 305 an opportunity to present content to a viewing user of the online system 140 upon receiving a request from the viewing user to access a user profile page associated with the viewing user maintained in the online system 140, in which the user profile page includes a newsfeed in which various content items may be presented. As an additional example, the online system 140 may identify 305 an opportunity to present content to a viewing user of the online system 140 upon receiving a request to present a web page maintained in the online system 140 to the viewing user, in which the web page includes a scrollable feed in which advertisements and other types of content items may be presented.

Upon identifying 305 the opportunity to present content to the viewing user, the online system 140 may identify 310 (e.g., using the content selection module 230) one or more candidate content items (e.g., advertisements) eligible for presentation to the viewing user. As described above, a candidate content item is a content item associated with at least a threshold number of targeting criteria satisfied by characteristics of the viewing user or is a content item that is not associated with targeting criteria. As also described above, targeting criteria associated with a candidate content item may specify one or more characteristics of users (e.g., actions performed by the users or types of connections between the users and other users or objects of the online system 140) eligible to be presented with content in the candidate content item and may be specified by a content-providing user 300 of the online system 140 associated with the candidate content item. The online system 140 may identify 310 the candidate content item(s) by accessing information stored in the online system 140 (e.g., user profile information associated with the viewing user stored in the user profile store 205, information describing actions performed by the viewing user stored in the action log 220, connections established between the viewing user and other online system users stored in the edge store 225, etc.). The online system 140 then sends 315 the candidate content item(s) for display to a client device 110 associated with the viewing user.

The online system 140 computes 320 (e.g., using the value estimation module 235) an estimated value associated with presenting a candidate content item to the viewing user, in which the estimated value corresponds to a value to the online system 140 (e.g., an amount charged to an advertiser) and the candidate content item is included among the candidate content item(s) sent 315 for display to the client device 110 associated with the viewing user. In some embodiments, the estimated value associated with presenting the candidate content item to the viewing user may be computed 320 based at least in part on a bid amount associated with the candidate content item. In such embodiments, the bid amount may be received from a content-providing user 300 of the online system 140 associated with the candidate content item (e.g., an advertiser from whom an advertisement corresponding to the candidate content item was received). In various embodiments, the estimated value associated with presenting the candidate content item also may be computed 320 based at least in part on a predicted affinity of the viewing user for the candidate content item. In such embodiments, the online system 140 may predict the affinity of the viewing user for the candidate content item (e.g., using a machine-learning model) based at least in part on information associated with the candidate content item (e.g., targeting criteria) and user-specific information associated with the viewing user maintained in the online system 140 (e.g., demographic information associated with the viewing user, actions performed by the viewing user in the online system 140, interests/hobbies of online system users connected to the viewing user in the online system 140, etc.).

In some embodiments, the online system 140 also may compute 320 the estimated value associated with presenting the candidate content item to the viewing user based at least in part on an adjustment value curve associated with the viewing user and/or the client device 110 associated with the viewing user. The adjustment value curve correlates adjustment values to positions within a feed of content items in which candidate content items may be sent 315 for display to the viewing user. In embodiments in which the online system 140 computes 320 the estimated value associated with presenting the candidate content item to the viewing user based at least in part on an adjustment value curve, the online system 140 may generate the adjustment value curve based on various types of information maintained in the online system 140. In some embodiments, the online system 140 also may store the adjustment value curve (e.g., in association with information associated with the viewing user/the client device 110 associated with the viewing user in the user profile store 205).

Once the online system 140 has computed 320 the estimated value associated with presenting the candidate content item to the viewing user, the online system 140 may store 325 (e.g., using the value estimation module 235) the estimated value. The online system 140 communicates 330 the estimated value to the content-providing user 300 of the online system 140 associated with the candidate content item. For example, the online system 140 may charge an advertiser from whom an advertisement corresponding to the candidate content item was received an amount corresponding to the estimated value.

After the online system 140 has sent 315 the candidate content item(s) for display to the client device 110 associated with the viewing user, the client device 110 ranks 335 the candidate content item(s). The client device 110 may rank 335 the candidate content item(s) based on information maintained at the client device 110 that may not be available to the online system 140. Examples of information maintained at the client device 110 that may not be available to the online system 140 include real-time information, such as information indicating an orientation of a display area of the client device 110 (e.g., landscape or portrait orientation), a text size of text presented in the display area of the client device 110, a viewing preference (e.g., a zoom setting or a brightness setting), etc., which may affect the types and/or number of candidate content items that may be presented and the positions within a user interface in which the candidate content items may be presented.

The client device 110 then determines 340 a placement of each of the candidate content item(s) within a feed of content items (e.g., a newsfeed). In some embodiments, the client device 110 may determine 340 the placement of the candidate content item(s) within the feed of content items based on the ranking. For example, a highest ranked candidate content item may be placed in a most prominent position within a feed while a second highest ranked candidate content item may be placed in a second most prominent position within the feed, etc. In some embodiments, information describing the placement of the candidate content item(s) within the feed of content items may be stored 345 at the client device 110. The candidate content item(s) are then presented 350 to the viewing user at the client device 110 via the feed of content items.

Figure 4:
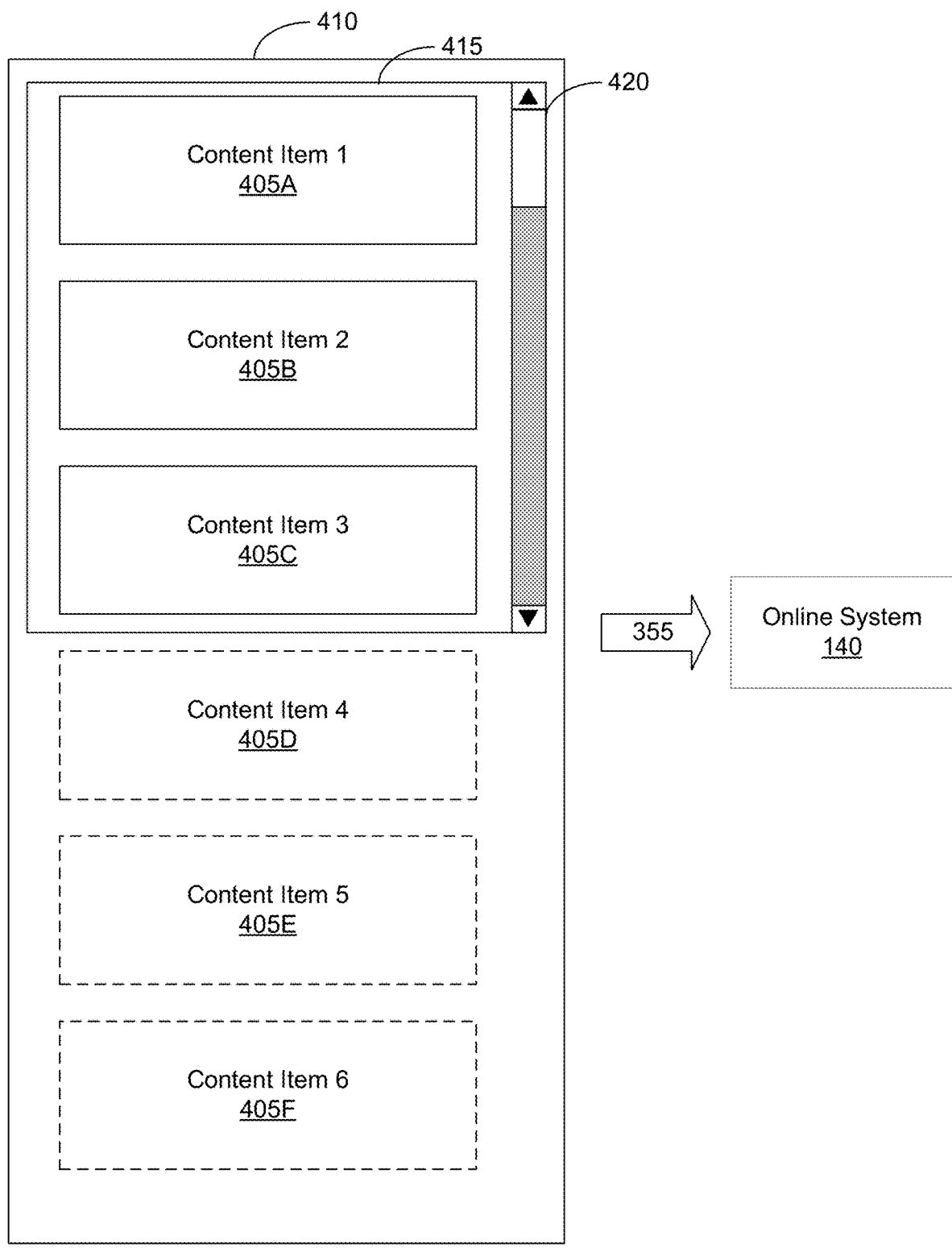
FIG. 4 is an example of a feed of content items presented to a viewing user of an online system in a display area of a client device, in accordance with an embodiment.

The online system 140 then receives 355 information from the client device 110 describing the placement of one or more of the candidate content item(s) within the feed of content items presented 350 to the viewing user. In some embodiments, the information received 355 from the client device 110 may describe the placement of each candidate content item within the feed of content items. For example, as shown in FIG. 4, the online system 140 may receive 355 information indicating that a first candidate content item (Content Item 1) 405A was presented 350 in a most prominent position within a newsfeed 410, that a second candidate content item (Content Item 2) 405B was presented 350 in a second-most prominent position within the newsfeed 410, etc., such that the placement of each candidate content item 405A-F in the entire newsfeed 410 is received 355 at the online system 140.

In various embodiments, the information received 355 from the client device 110 may describe the placement of some of the candidate content item(s) 405 within the feed 410 of content items. In the example of FIG. 4, suppose that two of the candidate content items 405 (Content Item 3 405C and Content Item 5 405E) presented 350 in the newsfeed 410 correspond to advertisements, the first of which is presented 350 in a third position of the newsfeed 410 and the second of which is presented 350 in a fifth position of the newsfeed 410. Suppose also that the other candidate content items 405A-B, 405D, 405F correspond to stories generated by users of the online system 140. In this example, the online system 140 may receive 355 information identifying the first of the two advertisements (Content Item 3 405C) and information identifying content items 405D-F that are presented 350 in positions within the newsfeed 410 that are less prominent than the third position of the newsfeed 410 in which the first advertisement is presented 350. Continuing with this example, the online system 140 also may receive 355 information identifying the second of the two advertisements (Content Item 5 405E) and information identifying a content item 405F that is presented 350 in a position within the newsfeed 410 that is less prominent than the fifth position of the newsfeed 410 in which the second advertisement is presented 350. In the above example, the online system 140 also may receive 355 information identifying a position within the newsfeed 410 in which each of the content items 405D-F is presented 350.

In some embodiments, the information received 355 from the client device 110 describing the placement of the candidate content item(s) 405 within the feed 410 of content items may be limited (e.g., based on a time associated with the candidate content item(s) 405, a number of sponsored and/or non-sponsored content items included among the candidate content item(s) 405, a session associated with the viewing user, a rolling window in which the candidate content item(s) 405 are presented 350, etc.). As shown in the example of FIG. 4, the online system 140 may receive 355 information identifying candidate content items 405A-C that have been presented 350 in positions within a newsfeed 410 that overlap with a rolling window (e.g., a rolling window corresponding to a display area 415 of the client device 110). In this example, the online system 140 subsequently may receive 355 information from the client device 110 identifying additional candidate content items 405D-F included in the newsfeed 410 if the display area 415 overlaps with these candidate content items 405D-F (i.e., if the viewing user moves a scroll bar 420 associated with the newsfeed 410 so that these additional candidate content items 405D-F are presented 350 within the display area 415). As an additional example, the information received 355 from the client device 110 may identify only candidate content items 405 that are associated with a particular time or time span (e.g., non-sponsored content items that were generated by online system users after a particular time or within a threshold amount of time from a current time). As another example, the information received 355 from the client device 110 may identify only a particular number of candidate content items 405 most recently included in a newsfeed 410. As yet another example, the information received 355 from the client device 110 may identify only candidate content items 405 included in a newsfeed 410 that have not been presented 350 in previous user sessions associated with the viewing user.

Referring now to FIG. 3B, the online system 140 also may receive 360 (e.g., via the action logger 215) information from the client device 110 associated with the viewing user describing user engagement with the online system 140 by the viewing user. The online system 140 calculates 365 (e.g., using the effect calculation module 240) a detrimental effect of presenting 350 a candidate content item to the viewing user on user engagement with the online system 140 by the viewing user, in which the detrimental effect is sustained by the online system 140. In various embodiments, the detrimental effect of presenting the candidate content item to the viewing user on user engagement with the online system 140 by the viewing user may account for a reduction in user engagement by the viewing user with other content items with which the viewing user is likely to engage. In some embodiments, the online system 140 may calculate 365 the detrimental effect based on the information received 355 from the client device 110 describing the placement of one or more of the candidate content item(s) within the feed of content items presented 350 to the viewing user. In such embodiments, the online system 140 may calculate 365 the detrimental effect by determining a difference between an effect of presenting 350 the candidate content item to the viewing user on user engagement with the online system 140 by the viewing user and an effect of not presenting 350 the candidate content item to the viewing user, in which the detrimental effect is indicated by the difference. In various embodiments, the online system 140 may predict the effect(s) (e.g., using a machine-learning model). In some embodiments, the effect of presenting 350 the candidate content item to the viewing user on user engagement with the online system 140 by the viewing user may correspond to the information received 360 from the client device 110 describing user engagement with the online system 140 by the viewing user.

The online system 140 then computes 370 (e.g., using the value adjustment module 245) an adjusted value associated with presenting 350 the candidate content item to the viewing user. Similar to the estimated value, the adjusted value corresponds to a value to the online system 140. In some embodiments, the online system 140 may compute 370 the adjusted value based at least in part on the detrimental effect of presenting the candidate content item to the viewing user on user engagement with the online system 140 by the viewing user (e.g., using a Vickrey-Clarke-Groves mechanism). For example, the online system 140 may compare a value corresponding to the detrimental effect of presenting 350 the candidate content item to the viewing user on user engagement with the online system 140 by the viewing user to a threshold value. In this example, the online system 140 may compute 370 an adjusted value associated with presenting 350 the candidate content item to the viewing user that is higher than the estimated value associated with presenting 350 the candidate content item to the viewing user if the value corresponding to the detrimental effect is greater than the threshold value. In contrast, in the above example, the online system 140 may compute 370 an adjusted value associated with presenting 350 the candidate content item to the viewing user that is lower than the estimated value associated with presenting 350 the candidate content item to the viewing user if the value corresponding to the detrimental effect is less than the threshold value. In the above example, the online system 140 may compute 370 an adjusted value associated with presenting 350 the candidate content item to the viewing user that is equal to the estimated value associated with presenting 350 the candidate content item to the viewing user if the value corresponding to the detrimental effect is equal to the threshold value. Furthermore, in the above example, the adjusted value associated with presenting 350 the candidate content item to the viewing user may be proportional to a difference between the value corresponding to the detrimental effect and the threshold value.

In various embodiments, rather than computing 320 the estimated value associated with presenting 350 the candidate content item to the viewing user and computing 370 the adjusted value associated with presenting 350 the candidate content item to the viewing user, the online system 140 may compute 375 (e.g., using the value computation module 250) a single value associated with presenting 350 the candidate content item to the viewing user. In such embodiments, the value corresponds to a value to the online system 140 (e.g., an amount charged to an advertiser). In such embodiments, the online system 140 may calculate 365 the detrimental effect of presenting 350 the candidate content item to the viewing user on user engagement with the online system 140 by the viewing user by determining a difference between the effects of presenting 350 and not presenting 350 the candidate content item to the viewing user, as described above. The online system 140 may then compute 375 a value associated with presenting 350 the candidate content item to the viewing user based at least in part on the detrimental effect.

In some embodiments, the online system 140 may communicate 380 the adjusted value associated with presenting 350 the candidate content item to the viewing user to the content-providing user 300 of the online system 140 associated with the candidate content item. For example, suppose that the online system 140 charges an advertiser an estimated value computed 320 by the online system 140 for presenting 350 an advertisement corresponding to a candidate content item to the viewing user. In this example, the online system 140 may communicate 380 an adjusted value associated with presenting 350 the advertisement to the viewing user by charging or refunding the advertiser an additional amount corresponding to a difference between the estimated value and the adjusted value. In some embodiments, the online system 140 may delay communicating 380 the adjusted value to the content-providing user 300 of the online system 140 until a later time. In the above example, the online system 140 may charge or refund the advertiser the difference by adjusting an amount that subsequently is charged to the advertiser (e.g., an amount corresponding to an estimated value associated with presenting 350 an additional advertisement received from the advertiser to the same or a different viewing user of the online system 140).

In embodiments in which the online system 140 computes 375 a single value associated with presenting 350 the candidate content item to the viewing user, the online system 140 also may communicate 380 the value to the content-providing user 300 of the online system 140 associated with the candidate content item. For example, suppose that the online system 140 presents 350 a candidate content item to the viewing user, in which the candidate content item corresponds to an advertisement received from an advertiser. In this example, the online system 140 may communicate 380 a value computed 375 by the online system 140 associated with presenting 350 the advertisement to the viewing user by charging the advertiser an amount corresponding to the value.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
identifying an opportunity to present content to a viewing user of an online system;
identifying a set of candidate content items eligible for presenting to the viewing user;
computing an estimated value associated with presenting a candidate content item of the set of candidate content items to the viewing user based at least in part on a bid amount associated with the candidate content item;
communicating the estimated value to a content-providing user of the online system associated with the candidate content item;

sending the set of candidate content items to a client device associated with the viewing user;

determining, by the client device, a placement of a subset of the set of candidate content items within a feed of content items, the subset of the set of candidate content items includes the candidate content item;

presenting, by the client device, based on the determined placement, the subset of the set of candidate content items to the viewing user;

receiving, from the client device after the subset of the set of candidate content items are presented, information describing the placement of the subset of the set of candidate content items within the feed of content items presented to the viewing user;

calculating a detrimental effect of presenting the candidate content item to the viewing user on user engagement with the online system by the viewing user, the detrimental effect calculated based at least in part on the received information describing the placement of the subset of the set of candidate content items within the feed of content items; and computing an adjusted value associated with presenting the candidate content item to the viewing user based at least in part on the detrimental effect.

2. The method of claim 1, wherein calculating the detrimental effect of presenting the candidate content item to the viewing user on user engagement with the online system by the viewing user comprises:

receiving information describing a first effect of presenting the candidate content item to the viewing user on user engagement with the online system by the viewing user;

predicting a second effect of not presenting the candidate content item to the viewing user on user engagement with the online system by the viewing user based at least in part on the placement of the subset of the set of candidate content items within the feed of content items; and determining a difference between the first effect and the second effect, wherein the difference indicates the detrimental effect of presenting the candidate content item to the viewing user on user engagement with the online system by the viewing user.

3. The method of claim 2, wherein the adjusted value associated with presenting the candidate content item to the viewing user is greater than the estimated value associated with presenting the candidate content item to the viewing user if the difference between the first effect and the second effect is greater than a threshold value.

4. The method of claim 2, wherein the adjusted value associated with presenting the candidate content item to the viewing user is less than the estimated value associated with presenting the candidate content item to the viewing user if the difference between the first effect and the second effect is less than a threshold value.

5. The method of claim 1, further comprising:

communicating the adjusted value to the content-providing user of the online system associated with the candidate content item; and adjusting a value associated with presenting a content item associated with the content-providing user of the online system based at least in part on an additional difference between the estimated value associated with presenting the candidate content item to the viewing user and the adjusted value associated with presenting the candidate content item to the viewing user.

6. The method of claim 1, wherein the estimated value associated with presenting the candidate content item of the set of candidate content items to the viewing user is further based at least in part on an adjustment value corresponding to an adjustment value curve associated with the client device, wherein the adjustment value curve correlates the adjustment value to a position within the feed of content items in which the candidate content item is sent for display to the client device associated with the viewing user.

7. The method of claim 1, wherein the information describing the placement of the subset of the set of candidate content items within the feed of content items comprises information describing the placement of each of the subset of the set of candidate content items in each of one or more positions within the feed of content items.

8. The method of claim 7, wherein the one or more positions are less prominent than a position within the feed of content items in which the candidate content item is presented to the viewing user.

9. The method of claim 1, wherein the estimated value associated with presenting the candidate content item to the viewing user is further based at least in part on a predicted affinity of the viewing user for the candidate content item.

10. The method of claim 1, wherein the adjusted value associated with presenting the candidate content item to the viewing user is further based at least in part on a Vickrey-Clarke-Groves mechanism.

11. The method of claim 1, wherein the information describing the placement of the subset of the set of candidate content items within the feed of content items comprises real-time information maintained at the client device.

12. A computer program product comprising:

at least one first computer readable storage medium having instructions encoded thereon that, when executed by a first processor of an online system, cause the first processor to:

identify an opportunity to present content to the viewing user of the online system;

identify a set of candidate content items eligible for presenting to the viewing user;

compute an estimated value associated with presenting a candidate content item of the set of candidate content items to the viewing user based at least in part on a bid amount associated with the candidate content item; and communicate the estimated value to a content-providing user of the online system associated with the candidate content item; and at least one second computer readable storage medium having instructions encoded thereon that, when executed by a second processor of a client device, cause the second processor to:

determine a placement of a subset of the set of candidate content items within a feed of content items, the subset of the set of candidate content items includes the candidate content item;

present based on the determined placement, the subset of the set of candidate content items to the viewing user; and after the subset of the set of candidate content items are presented, identify information describing the placement of the subset of the set of candidate content items within the feed of content items presented to the viewing user;

wherein the at least one first computer readable storage medium further has instructions encoded thereon that, when executed by the first processor of the online system, cause the first processor to:
calculate a detrimental effect of presenting the candidate content item to the viewing user on user engagement with the online system by the viewing user, the detrimental effect calculated based at least in part on the information describing the placement of the subset of the set of candidate content items within the feed of content items; and
compute an adjusted value associated with presenting the candidate content item to the viewing user based at least in part on the detrimental effect.

13. The computer program product of claim 12, wherein calculating the detrimental effect of presenting the candidate content item to the viewing user on user engagement with the online system by the viewing user comprises:
receive information describing a first effect of presenting the candidate content item to the viewing user on user engagement with the online system by the viewing user;
predict a second effect of not presenting the candidate content item to the viewing user on user engagement with the online system by the viewing user based at least in part on the placement of the subset of the set of candidate content items within the feed of content items; and
determine a difference between the first effect and the second effect, wherein the difference indicates the detrimental effect of presenting the candidate content item to the viewing user on user engagement with the online system by the viewing user.

14. The computer program product of claim 13, wherein the adjusted value associated with presenting the candidate content item to the viewing user is greater than the estimated value associated with presenting the candidate content item to the viewing user if the difference between the first effect and the second effect is greater than a threshold value.

15. The computer program product of claim 13, wherein the adjusted value associated with presenting the candidate content item to the viewing user is less than the estimated value associated with presenting the candidate content item to the viewing user if the difference between the first effect and the second effect is less than a threshold value.

16. The computer program product of claim 12, wherein the at least one first computer readable storage medium further has instructions encoded thereon that, when executed by the first processor of the online system, cause the first processor to:
communicate the adjusted value to the content-providing user of the online system associated with the candidate content item; and
adjust a value associated with presenting a content item associated with the content-providing user of the online system based at least in part on an additional difference between the estimated value associated with presenting the candidate content item to the viewing user and the adjusted value associated with presenting the candidate content item to the viewing user.

17. The computer program product of claim 12, wherein the estimated value associated with presenting the candidate content item of the set of candidate content items to the viewing user is further based at least in part on an adjustment value corresponding to an adjustment value curve associated with the client device, wherein the adjustment value curve correlates the adjustment value to a position within the feed of content items in which the candidate content item is sent for display to the client device associated with the viewing user.

18. The computer program product of claim 12, wherein the information describing the placement of the subset of the set of candidate content items within the feed of content items comprises information describing the placement of each of the subset of the set of candidate content items in each of one or more positions within the feed of content items.

19. The computer program product of claim 18, wherein the one or more positions are less prominent than a position within the feed of content items in which the candidate content item is presented to the viewing user.

20. The computer program product of claim 12, wherein the estimated value associated with presenting the candidate content item to the viewing user is further based at least in part on a predicted affinity of the viewing user for the candidate content item.

21. The computer program product of claim 12, wherein the adjusted value associated with presenting the candidate content item to the viewing user is further based at least in part on a Vickrey-Clarke-Groves mechanism.

22. The computer program product of claim 12, wherein the information describing the placement of the subset of the set of candidate content items within the feed of content items comprises real-time information maintained at the client device.

23. A method comprising:
identifying an opportunity to present content to a viewing user of an online system;
identifying a set of candidate content items eligible for presenting to the viewing user;
sending the set of candidate content items to a client device associated with the viewing user;
determining, by the client device, a placement of a subset of the set of candidate content items within a feed of content items, the subset of the set of candidate content items includes the candidate content item;
presenting, by the client device, based on the determined placement, the subset of the set of candidate content items to the viewing user;
receiving, from the client device after a subset of the set of candidate content items are presented to the viewing user, information describing the placement of the subset of the set of candidate content items within the feed of content items presented to the viewing user;
calculating a detrimental effect of presenting the candidate content item to the viewing user on user engagement with the online system by the viewing user, the detrimental effect calculated based at least in part on the received information describing the placement of the subset of the set of candidate content items within the feed of content items; and
computing a value associated with presenting the candidate content item to the viewing user based at least in part on the detrimental effect.

24. The method of claim 23, further comprising:
computing an estimated value associated with presenting the candidate content item to the viewing user based at least in part on a bid amount associated with the candidate content item; and
communicating one or more of the value and the estimated value to a content-providing user of the online system associated with the candidate content item.

25. The method of claim 23, wherein calculating the detrimental effect of presenting the candidate content item to the viewing user on user engagement with the online system by the viewing user comprises:
- receiving information describing a first effect of presenting the candidate content item to the viewing user on user engagement with the online system by the viewing user;
- predicting a second effect of not presenting the candidate content item to the viewing user on user engagement with the online system by the viewing user based at least in part on the placement of the subset of the set of candidate content items within the feed of content items; and
- determining a difference between the first effect and the second effect, wherein the difference indicates the detrimental effect of presenting the candidate content item to the viewing user on user engagement with the online system by the viewing user.

\* \* \* \* \*